(12) United States Patent
Criddle et al.

(10) Patent No.: US 9,598,234 B1
(45) Date of Patent: Mar. 21, 2017

(54) TRASH AND RECYCLING HANDLING SYSTEM AND METHOD

(71) Applicants: Anthony Wayne Criddle, Federal Way, WA (US); Matthew Reed Fairbanks, Renton, WA (US)

(72) Inventors: Anthony Wayne Criddle, Federal Way, WA (US); Matthew Reed Fairbanks, Renton, WA (US)

(73) Assignee: CONRAC Solutions, LLC, Anchorage, AK (US)

( * ) Notice: Subject to any disclaimer, the term of this patent is extended or adjusted under 35 U.S.C. 154(b) by 269 days.

(21) Appl. No.: 14/278,172

(22) Filed: May 15, 2014

Related U.S. Application Data (60) Provisional application No. 61/823,701, filed on May 15, 2013.

(51) Int. Cl.
*B65F 9/00* (2006.01)
*B65F 1/00* (2006.01)
*B62D 53/00* (2006.01)
*B65G 67/24* (2006.01)

(52) U.S. Cl.
CPC ............ *B65F 1/0053* (2013.01); *B62D 53/00* (2013.01); *B65F 9/00* (2013.01); *B65G 67/24* (2013.01)

(58) Field of Classification Search
CPC .......... B65G 67/24; B65F 1/0053; B65F 1/00; B65F 9/00; B65F 3/02; B65F 1/1468; B62D 53/00
USPC ........................................................ 414/809
See application file for complete search history.

(56) References Cited

U.S. PATENT DOCUMENTS

| | | | | | |
|---|---|---|---|---|---|
| 3,269,580 | A | * | 8/1966 | Tolbert, Jr. ............... | B60D 1/00 220/23.4 |
| 3,294,418 | A | * | 12/1966 | Middlesworth ........ | B62D 13/00 280/406.1 |
| 3,666,130 | A | * | 5/1972 | Ellerd .................... | B62D 53/00 280/408 |
| 4,046,271 | A | * | 9/1977 | Klosk ....................... | B65F 1/10 232/43.2 |
| 5,131,552 | A | * | 7/1992 | Falso ...................... | B65F 1/085 220/23.4 |
| 5,135,245 | A | * | 8/1992 | Pagone .................... | B62B 3/10 220/23.4 |
| 8,727,671 | B2 | * | 5/2014 | Sundholm ............... | E04F 17/10 132/333 |

(Continued)

*Primary Examiner* — Kaitlin Joerger
(74) *Attorney, Agent, or Firm* — Stoel Rives LLP (57) ABSTRACT

Systems and methods for efficiently collecting and disposing waste from disparate locations within a facility, the method including coupling a series of empty waste receptacles to a tow vehicle and transporting the receptacles to a first location. At the first location, identifying a first full waste receptacle and exchanging it with one of the empty receptacles coupled to the vehicle. The full waste receptacle and remaining empty receptacles are thereafter transported via the tow vehicle to a second location, where a second full waste receptacle is exchanged with one of the remaining empty receptacles. Thereafter, the first and second full waste receptacles are transported to a waste processing location. In some embodiments, the process may be repeated until all the empty waste receptacles on the vehicle have been exchanged with full waste receptacles, at which point the vehicle transports the full waste receptacles to the waste processing location.

15 Claims, 4 Drawing Sheets

(56) References Cited

U.S. PATENT DOCUMENTS

2014/0097585 A1\* 4/2014 Baird .................... B62B 5/0086
   280/63
2014/0356111 A1\* 12/2014 Lykkegaard ............ B64F 1/368
   414/398

\* cited by examiner

TRASH AND RECYCLING HANDLING SYSTEM AND METHOD

RELATED APPLICATION DATA

This application is a nonprovisional of and claims the benefit under 35 U.S.C. §119(e) of U.S. Provisional Patent Application No. 61/823,701, filed May 15, 2013, the disclosure of which is incorporated by reference herein in its entirety.

TECHNICAL FIELD

The field of the disclosure relates generally to systems and methods for efficiently handling trash and recyclable waste particularly in large facilities and complexes.

BACKGROUND

In facilities that handle an abundance of waste (e.g., trash, composting, recyclable waste, etc.), such as those that may specialize in the collection and disposal of waste, or in which cleaning, manufacturing, public assembly or other activities result in the ancillary generation or aggregation of substantial volumes of waste, efficient waste management may be critical to the overall effectiveness of the facility. For example, some facilities may specialize in cleaning out the interior cabins of cars, trucks, buses, or other vehicles as part of preparation of the vehicles for subsequent use. In some of these facilities, waste may be, and often is, touched or otherwise handled five or more times by the same or different personnel as it is removed from the vehicles, transported through the facility, and ultimately removed from the premises.

For example, waste may first be cleaned out of a vehicle and placed into a bag-lined or unlined trash and/or recycle receptacle. Thereafter, as each receptacle becomes full, the bag liners or receptacles are moved, with or without manual or mechanical closure, from an initial location near the vehicle clean-out area to a staging area where they are aggregated or stored. Janitorial or other personnel then pick up the bags or receptacles from the staging area and transport them to a waste processing area. There, the bags are placed into, or the receptacles are dumped into, one or more large dumpsters or compactors (e.g., separate dumpsters or compactors for trash and recycling). Finally, the serially-handled waste is either emptied from the dumpster or compactor into a truck for removal from the premises, or the dumpster or compactor itself placed on or attached to a truck or trailer and transported off the premises.

The present inventors have, thus, recognized a need for improved systems and methods of handling waste to reduce the number of times waste is touched or handled, and to thereby streamline the waste management process by reducing the required labor.

Additional aspects and advantages will be apparent from the following detailed description of preferred embodiments, which proceeds with reference to the accompanying drawings.

DETAILED DESCRIPTION OF PREFERRED EMBODIMENTS

With reference to the drawings, this section describes particular embodiments and their detailed construction and operation. Throughout the specification, reference to "one embodiment," "an embodiment," or "some embodiments" means that a particular described feature, structure, or characteristic may be included in at least one embodiment. Thus appearances of the phrases "in one embodiment," "in an embodiment," or "in some embodiments" in various places throughout this specification are not necessarily all referring to the same embodiment. Furthermore, the described features, structures, characteristics, and methods of operation may be combined in any suitable manner in one or more embodiments. In view of the disclosure herein, those skilled in the art will recognize that the various embodiments can be practiced without one or more of the specific details or with other methods, components, materials, or the like. In some instances, well-known structures, materials, or operations are not shown or not described in detail to avoid obscuring aspects of the embodiments.

On some occasions, the description of the figures may reference a car-cleaning or car-service facility as an example setting for the described embodiments. It should be understood that a car-cleaning facility is merely one example setting for the described systems and methods and should not be considered as limiting. Systems and methods with the characteristics and features described herein may also be used to streamline a waste management processing in other complexes, such as manufacturing facilities, amusement parks, malls, stadiums, parks, and zoos.

In the context of the illustrated figures, the following description may refer to various embodiments relating to "waste" or "waste material" management. It should be understood that these terms are meant to broadly encompass a variety of forms and states of waste and other substances excess to, or undesirable for retention in, their location or condition. Accordingly, some examples of "waste" or "waste material" may include, but are not limited to, the following: trash, recyclable materials, compostable materials, hazardous materials, biological waste, and other items whether solid or liquid and regardless of value. In addition, when used specifically, the term "recyclable waste" refers to a material which can be processed, treated, or otherwise altered to recover at least a portion of material that can be re-purposed or reused, including as a material for re-processing or re-manufacture. For instance, "recyclable waste" may include, but is not limited to, paper, cardboard, metal, glass, plastics, polymers, batteries, tires, textiles, timber, concrete, or the like.

Figure 1:
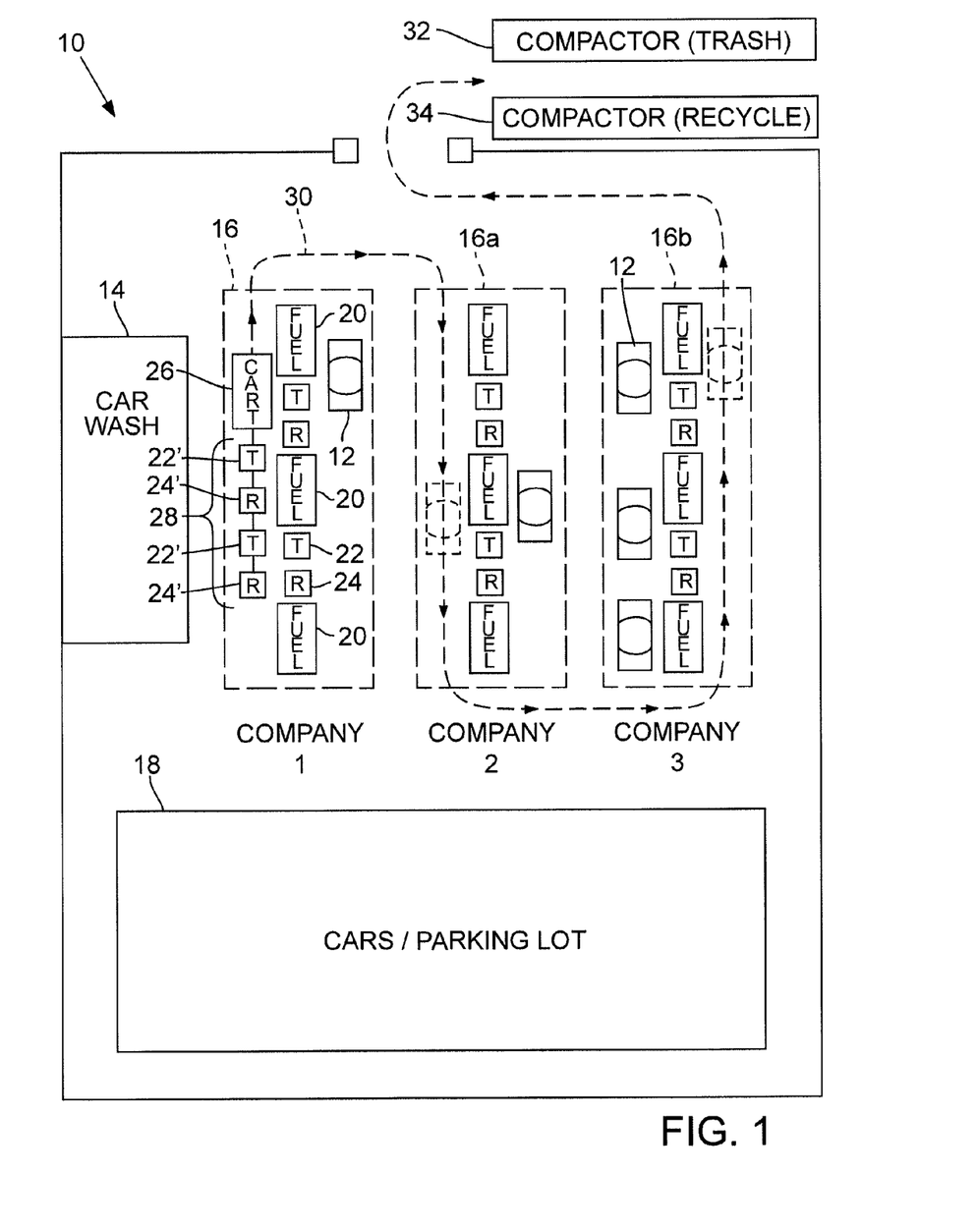
FIG. 1 is a schematic diagram illustrating an example facility layout and an example waste management process according to one embodiment.

FIG. 1 is a schematic diagram illustrating a layout of a facility 10 according to one embodiment. As illustrated in FIG. 1, the facility 10 may be configured for receiving and processing one or more vehicles 12, and may include services such as: washing the vehicles via a car wash 14, refueling and cleaning-out the vehicles 12 at one or separate "quick-turn" or maintenance stations 16 (or 16a, 16b), and thereafter parking the serviced vehicles 12 in a parking lot or structure 18.

In some configurations, the facility 10 may include a number of maintenance stations 16, 16a, 16b, arranged into a variety of rows or lanes as in a conventional gas station. The maintenance stations 16 may include one or more fueling stations 20 at or near which a number of waste receptacles 22, 24 are staged. The waste receptacles 22, 24 may each be specific to certain kinds of waste (e.g., co-mingled or distinct classes of recyclable waste, trash, etc.). For example, as illustrated in FIG. 1, receptacle 22 may be specific to trash and receptacle 24 may be specific to recycling. In one embodiment, the waste receptacles 22, 24 are positioned between fueling stations 20 for easy access so that the vehicles 12 may be cleaned out while being refueled.

In an example servicing process, a vehicle 12 is driven toward a maintenance station 16 and parked adjacent one of the fueling stations 20 before or after being washed. If the car needs fuel, the car may receive fuel from the fueling station 20. While fueling (or sometime thereafter), waste, recycling, or other abandoned or unwanted material is removed from the interior of the vehicle 12 and placed in one or more corresponding waste receptacles 22, 24. Once the vehicle 12 has been thoroughly cleaned-out, refueled, and washed (in any order), the vehicle 12 exits the maintenance station 16 and is driven to the parking lot or structure 18 for later use. As lanes open up, additional cars may be brought through for cleaning, refueling, and washing, as necessary.

As vehicles 12 are processed, the waste receptacles 22, 24 are continually filled with waste. As the waste receptacles 22, 24 become full (or at worker shift changes, or any other desired frequency), they are typically collected, emptied, or replaced with empty (or previously emptied) waste receptacles, often repeatedly over the course of a 24-hour period. It should be noted that any description referring to "empty" or "emptied" waste receptacles should be understood as including a waste receptacle from which a majority of its previous contents has been removed, but that may thereupon retain some amount of waste. Accordingly, these terms are not meant to limit an "empty" waste receptacle to a waste receptacle devoid of all waste.

FIG. 1 illustrates one example embodiment of a waste management process that may be used to handle waste produced at the facility 10. With particular reference to FIG. 1, a series or group of empty waste receptacles 28 may first be coupled directly or indirectly to a tow vehicle 26 via a coupling mechanism 60 (see FIG. 3) to form a train (e.g., a series of receptacles each connected to the rear of a preceding receptacle) of such waste receptacles. Further details of the coupling mechanism 60 are described with reference to FIGS. 2 and 3. The tow vehicle 26 may be any type of powered cart, tractor, all-terrain vehicle, or other powered vehicle or towing mechanism with sufficient maneuverability and towing capability for transporting the waste receptacles 22, 24. The vehicle 26 may be guided by an operator onboard the vehicle or not onboard the vehicle, such as by remote control, by a track or by another suitable control system.

The waste receptacles 22, 24 may be of any suitable dimensions, but are typically larger than a familiar 30 to 55-gallon receptacle ordinarily used as a first direct deposit receptacle for waste. For instance, in one embodiment, the waste receptacles 22, 24 may have a volume of up to one cubic yard (approximately 227 gallons). In other embodiments, the waste receptacles 22, 24 may be larger or smaller as desired. In addition, the waste receptacles 22, 24 preferably are equipped with wheels or casters 44, 46 (or mounted to a wheeled chassis 42) for easy movement.

Once the group of waste receptacles 28 is coupled to the tow vehicle 26, an operator or control system drives or guides the tow vehicle 26 along a path or route 30 and transports the empty waste receptacles 28 through the facility 10. As the tow vehicle 26 proceeds along the route 30, the operator or other control system observes or otherwise senses the waste receptacles (e.g., 22, 24) positioned near the fuel stations 20 to identify a waste receptacle, staged for use and similarly equipped or mounted, in need of emptying or replacement (i.e., a waste receptacle containing an amount of waste that needs to be collected and removed so the same or different receptacle can receive waste in that location until the tow vehicle 26 returns again, referred to herein as a "full waste receptacle" regardless of actual degree of fullness).

Once a full waste receptacle is identified (e.g., waste receptacle 22), the operator or control system stops the tow vehicle 26 and decouples an empty waste receptacle (e.g., waste receptacle 22') from the group of towed waste receptacles 28. After it is decoupled, the empty waste receptacle 22' is exchanged with the full waste receptacle 22; that is, the empty waste receptacle 22' is left behind and the full waste receptacle 22 is coupled to the tow vehicle 26 (or to the end of or at another position in the train of waste receptacles). Once the full waste receptacle 22 is properly coupled to the tow vehicle 26 or to the train of receptacles, the operator or control system continues driving or guiding the tow vehicle 26 along the route 30 in search of additional full waste receptacles and repeats the exchange between empty and full waste receptacles.

The process may be repeated until the train of receptacles has completed the route 30 through all or a portion of the facility and then heads toward one or more dumpsters or compactors 32, 34. The facility 10 may include a single separate dumpster or compactor, or, as shown in FIG. 1, the facility 10 may include separate dumpsters or compactors 32, 34 for processing trash and recyclable waste, respectively. In other embodiments, facilities may include additional dumpsters or compactors, such as for processing compostable materials, hazardous waste, or other distinct classes of recyclables and other waste. The efficiency of movement of waste from receptacles staged over an area or facility may reduce the number of compactor or dumpster sites otherwise needed to serve any particular size area or facility.

Once at the dumpster or compactor site, the full waste receptacles may be decoupled from the tow vehicle 26 and loaded onto a mechanism (such as a forklift as further described with reference to FIGS. 2-4) attached to or separate from the dumpsters or compactors 32, 34, designed to empty the full waste receptacles 22 into the dumpster or compactor and emptied. Once emptied, the empty waste receptacles are re-coupled, one onto the tow vehicle 26 and the other receptacles to another in a series, to form a new train of empty receptacles and the process is repeated to collect and replace other full waste receptacles with emptied waste receptacles.

In some instances, the operator may shorten the route 30 and proceed directly to the compactors 32, 34 when the train consists of only full waste receptacles without any remaining empty waste receptacles in the train, or when the train reaches an appropriate number, volume, or weight of full receptacles. It should be understood that the route 30 is drawn simply for illustration purposes and is not meant to be limiting. For instance, the route 30 could be any desired path through the facility 10 to collect and dispose waste receptacles 22, 24. In addition, the tow vehicle 26 may run the route 30 at specific time intervals throughout the day, or may run the route 30 on an on-call basis, or may travel to specific destinations on an on-call basis (e.g., when alerted that a waste receptacle is full at a particular location).

In some embodiments as shown in FIG. 1, the facility 10 may be segregated into smaller subdivisions of maintenance stations 16, 16a, 16b, each of which contain fuel stations 20 and waste receptacles 22, 24. The maintenance stations 16, 16a, 16b may be identical to one another, or one or more may be tailored with specific services, such as hand-washing, waxing, etc. to serve individual needs of various customers or distinct user companies (e.g., Company 1, Company 2, Company 3). In some instances, such separation may facilitate customizing such services on an individual basis for each of the user companies 1, 2, 3. In addition, separate maintenance stations 16, 16a, 16b for each user company may allow the waste management service provider to track individual usage by the various user companies to charge different service rates based on fuel consumption, volume of waste produced, or other factors.

Figure 2:
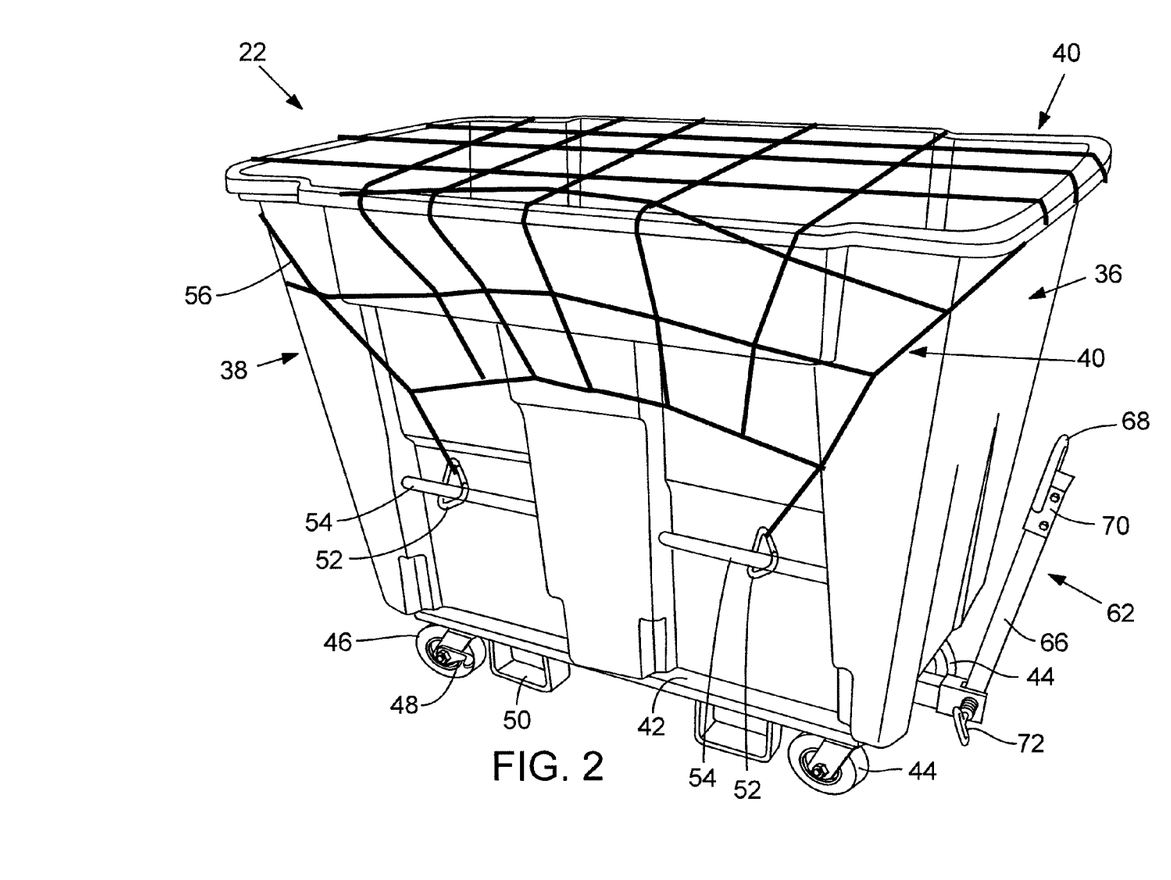
FIG. 2 is a perspective view of a waste receptacle according to one embodiment.

FIG. 2 illustrates an example waste receptacle 22 that may be used in the waste management process described with reference to FIG. 1. The waste receptacle 22 may be a conventional waste receptacle having an open top construction with a front wall 36, a rear wall 38, and two side walls 40. Preferably, the waste receptacle 22 is formed (e.g., injection molded) of durable, lightweight material, such as medium or high density polyethylene. In addition, the waste receptacle 22 is preferably a self-contained, hygienic plastic container which allows for easy cleaning, no spills, no pests, and no damage to surrounding equipment/vehicles if accidentally bumped or scraped. In other embodiments, the waste receptacles 22 may be formed of other materials, such as plastics, metals, or combinations of these materials.

The waste receptacle 22 is mounted to a cart, or preferably a chassis 42 fitted to a bottom or base of the receptacle 22. The chassis 42 includes a front set of wheels or casters 44 and a rear set of wheels or casters 46 to allow for rolling and easy maneuverability of the waste receptacle 22. In some embodiments, the rear set of casters 46 may have a swivel lock 48 for locking the casters into a straight position when desired. For instance, during transport of the waste receptacle 22 along the route 30, swivel-locking the rear casters 46 may help stabilize the waste receptacles 22 and prevent the waste receptacles 22 from swaying or fishtailing, whether moved individually or in a train of coupled waste receptacles. Preferably, the rear casters 46 are swivel-locked during transport, but are otherwise maintained in an unlocked position for easy movement/maneuvering of the waste receptacle 22 as needed. Alternatively, the rear casters 46 may be swivel-locked when in position at the maintenance stations 16 to help prevent the waste receptacles 22 from moving out of position when bumped. In some embodiments, the chassis 42 may further include a pair of pockets 50 formed or welded on either side of the chassis 42 for receiving forklift prongs (see FIG. 4). The prongs are inserted through the pockets 50 to lift and empty the waste receptacles 22 into the dumpsters or compactors 32, 34.

In some embodiments, the side walls 40 may include hooks, carabiners (or other attachment devices) 52, which may be attached to side bars 54. The attachment devices 52 may be used to hold or secure a netting 56 that extends over the open top of the waste receptacle 22. The netting 56 may help prevent loose waste from inadvertently falling or blowing out of the waste receptacle 22, such as during transport. Preferably, the openings in the netting 56 are sufficiently large such that waste can be dropped between the netting 56 and directly into the waste receptacle 22.

Figure 3:
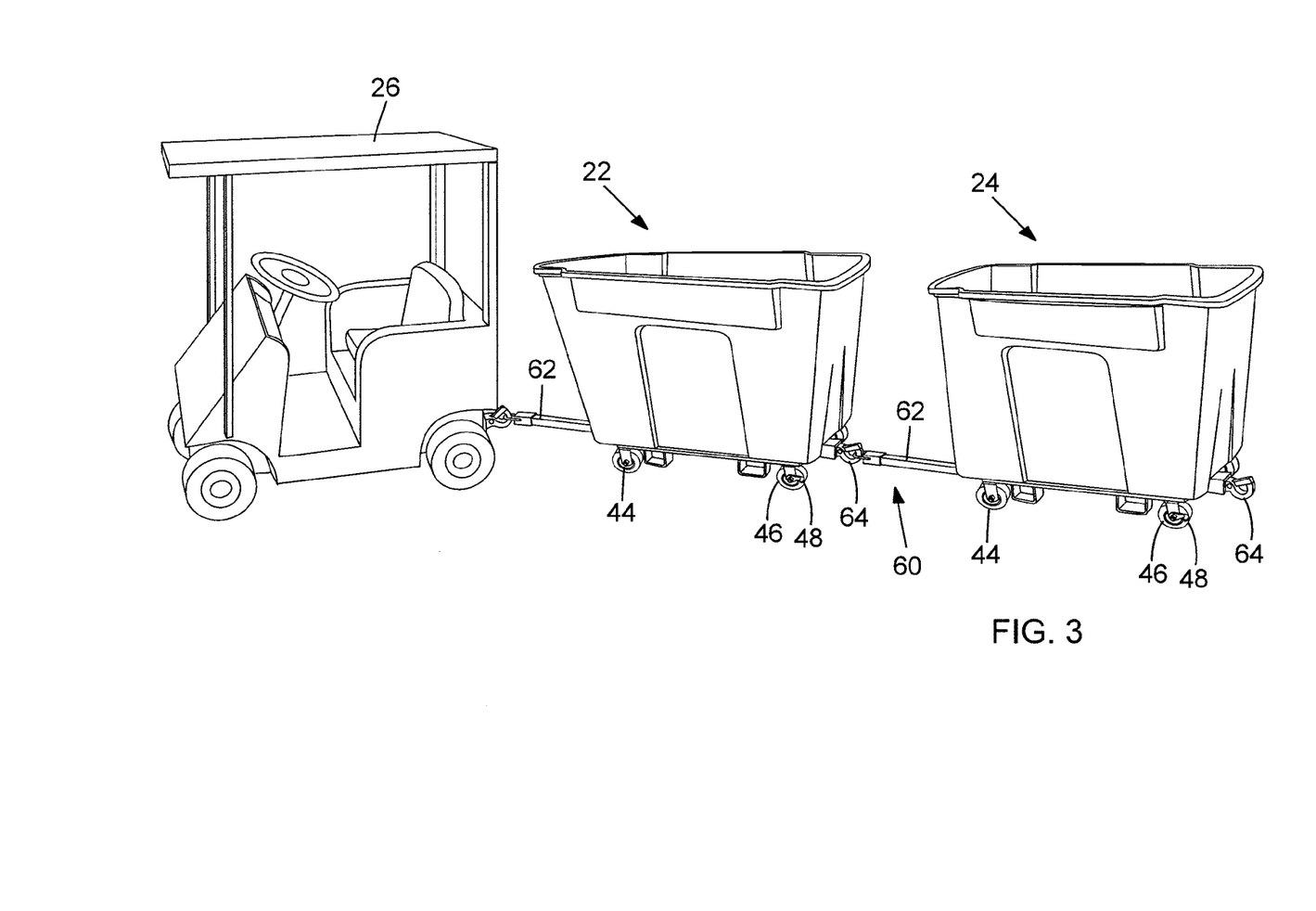
FIG. 3 is a side view of waste receptacles positioned in series and coupled together, with one end of the series coupled to a tow vehicle for transport as a train of receptacles.
Figure 4:
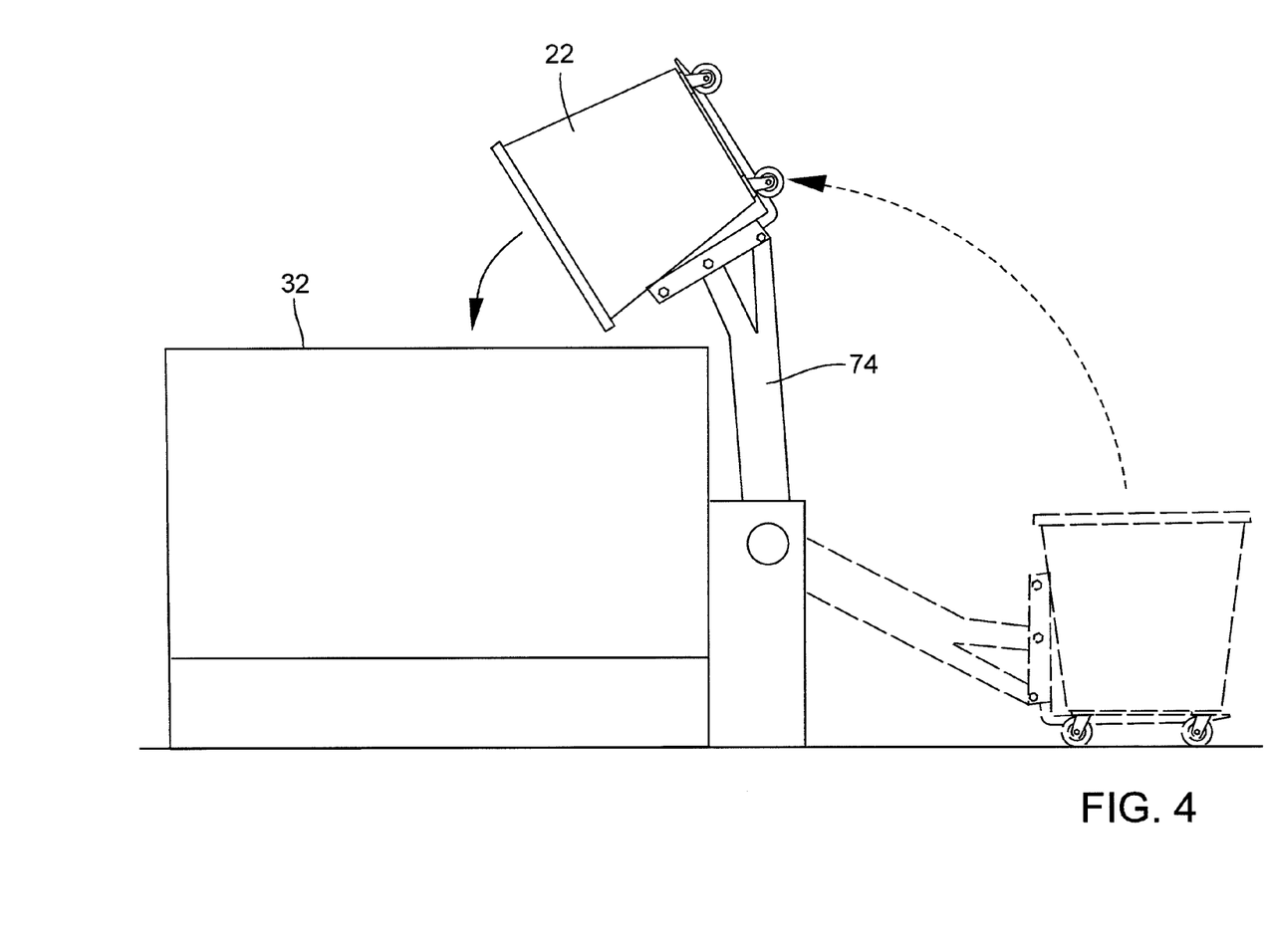
FIG. 4 is a schematic illustration of a waste receptacle being emptied into a compactor.

With reference to FIGS. 2 and 3, the chassis 42 further includes a coupling mechanism 60 operable to couple waste receptacles 22, 24 together and/or to the tow vehicle 26 for transport. The coupling mechanism 60 includes a tongue 62 and a receiving hitch 64. The tongue 62, which may extend from the front of the chassis in the direction of transport or from the rear of the chassis, includes an elongated bar 66 with a tow ring 68 (or other attachment mechanism) mounted or welded toward an end portion 70 of the bar 66. The tongue 62 further includes a hinge or other articulation mechanism near the chassis 42, with a spring-loaded lock mechanism 72, allowing the end portion 70 of the bar 66 to be lifted to bring the tongue 62 into a vertical position, and for locking and unlocking the tongue 62 in or out of that position as desired. For instance, when the waste receptacle 22 is not coupled to another waste receptacle 24 or to the tow vehicle 26, the tongue 62 may be locked in an upright position via the spring-loaded lock mechanism 72 as shown in FIG. 3. During use, the lock mechanism 72 may be released to allow the tongue 62 to drop downward and toward the hitch 64 of an adjoining waste receptacle.

In some embodiments, the tongue 62 may further include a supporting mechanism, such as a flexible arm or linkage (not shown), to help prevent the tongue 62 from dropping to the ground when the lock mechanism 72 is released. In addition, the supporting mechanism may limit the range of motion of the tongue 62 to help maintain the height position of the tow ring 68 approximately equal to the height position of the hitch 64 of an adjoining waste bin (or to the height of the drawbar (not shown) of the tow vehicle 26) to simplify the coupling process.

With reference to FIG. 3, the receiving hitch 64 may be generally hook shaped and complement the tow ring 68 of the tongue 62. In a coupled configuration, the hitch 64 is inserted through the opening on the tow ring 68 and the hitch 64 is thereafter closed. Similarly, to decouple the waste receptacles 22, 24, the hitch 64 opens up and frees the tow ring 68. The waste receptacles 22, 24 may thereafter be manually separated after raising the tongue 62 away from the hitch 64. It should be understood that in other embodiments, different coupling mechanisms may alternatively be used.

With particular reference to FIG. 3, the tow vehicle 26 may also be outfitted with a hitch 64' similar to hitch 64 for coupling with the tongue 62 of the waste receptacles 22, 24 in a similar fashion as described above. Alternatively, since the waste receptacles 22, 24 include both a tongue 62 and a hitch 64 on opposites sides, the tow vehicle 26 may instead include a tongue or other component (not shown) that mechanically engages the hitch of the waste receptacles 22, 24.

As briefly described previously, FIG. 4 illustrates a schematic of a waste receptacle 22 being lifted via a forklift mechanism 74 and emptied into a dumpster or compactor 32.

Although the description above contains much specificity, these details should not be construed as limiting the scope of the invention, but as merely providing illustrations of some embodiments of the invention. It should be understood that subject matter disclosed in one portion herein can be combined with the subject matter of one or more of other portions herein as long as such combinations are not mutually exclusive or inoperable.

The terms and descriptions used above are set forth by way of illustration only and are not meant as limitations.

Those skilled in the art will recognize that many variations can be made to the details of the above-described embodiments without departing from the underlying principles of the invention.

The invention claimed is:

1. A method for collecting and disposing waste from disparate locations to a centralized location within a facility, the method comprising:
coupling, either directly or indirectly, a series of empty waste receptacles to a vehicle, each of the empty waste receptacles including rollers attached thereto for supporting a rolling movement of the empty waste receptacle, wherein the rollers contact a ground surface when the empty waste receptacle is coupled to the vehicle;
transporting the series of empty waste receptacles to a first location via the vehicle traveling through the facility on the ground surface, wherein the rollers move along the ground surface to accommodate movement of the empty waste receptacles during transport;
at the first location,
identifying a first full waste receptacle containing waste material therein, the first full waste receptacle including a first set of rollers attached thereto;
decoupling from the vehicle a first empty waste receptacle of the series of empty waste receptacles;
exchanging the first empty waste receptacle with the first full waste receptacle; and
coupling, either directly or indirectly, the first full waste receptacle to the vehicle, wherein the first set of rollers contacts the ground surface;
transporting the first full waste receptacle and any remaining empty waste receptacles of the series of empty waste receptacles to a second location;
at the second location,
identifying a second full waste receptacle containing waste material therein, the second full waste receptacle including a second set of rollers attached thereto;
decoupling from the vehicle a second empty waste receptacle of the series of remaining empty waste receptacle;
exchanging the second empty waste receptacle with the identified second full waste receptacle; and
coupling, either directly or indirectly, the second full waste receptacle to the vehicle, wherein the second set of rollers contacts the ground surface;
transporting the first and second full wheeled waste receptacles on the ground surface to a waste processing or storage location;
decoupling from the vehicle the first and second full waste receptacles; and
emptying the waste material from the first and second full waste receptacles into a dumpster or waste compactor.

2. The method of claim 1, wherein the rollers of each of the empty waste receptacles in the series of empty waste receptacles comprise a set of swivel lockable casters, the method further comprising locking the set of swivel lockable casters straight prior to transporting the series of empty waste receptacles to the first location.

3. The method of claim 1, further comprising attaching a net over an open top of the first full waste receptacle prior to transporting the first full waste receptacle to the second location to prevent waste from spilling out of the first full waste receptacle during transport.

4. The method of claim 1, further comprising:
attaching a net over an open top of one or more of the empty waste receptacles in the series of empty waste receptacles before its use, wherein the net includes open spaces accommodating direct placement of waste therethrough and into the empty waste receptacle; and
leaving the net in place both during use of the empty waste receptacle, and during transport as a full waste receptacle to the second location to prevent waste from spilling out of the full waste receptacle during transport.

5. A method for collecting and disposing waste from disparate locations to a centralized location, the method comprising:
at a first location,
identifying a first full waste receptacle containing waste material therein;
coupling the first full waste receptacle to a vehicle;
transporting, via the vehicle, the first full waste receptacle to a second location;
at the second location,
identifying a second full waste receptacle containing waste material therein;
coupling the second full waste receptacle to the first full waste receptacle such that movement of the first full waste receptacle urges movement of the second full waste receptacle;
transporting the first and second full waste receptacles to a third location;
decoupling from the vehicle the first and second full waste receptacles; and
emptying the waste material from the first and second full waste receptacles into a dumpster or waste compactor positioned at the third location.

6. The method of claim 5, wherein each of the first and second waste receptacles are supported on an individual chassis, the chassis further including a set of swivel lockable casters, and wherein the method further comprises locking the set of swivel lockable casters straight on the first full waste receptacle prior to transporting the first full waste receptacle to the second location.

7. The method of claim 6, the method further comprising locking the set of swivel lockable casters straight on the second full waste receptacle prior to transporting the second full waste receptacle to the third location.

8. The method of claim 7, the method further comprising unlocking the set of swivel lockable casters on each of the first and second full waste receptacles prior to emptying the waste material from the first and second full waste receptacles into a dumpster or waste compactor.

9. The method of claim 1, wherein each of the empty waste receptacles in the series of empty waste receptacles further includes an attachment device supported thereon, the method further comprising attaching a net to one or more of the empty waste receptacles via the attachment device, the net extending over an open top of the one or more of the empty waste receptacles.

10. The method of claim 9, wherein the net includes open spaces to accommodate direct placement of waste therethrough and into the empty waste receptacle.

11. The method of claim 5, wherein each of the first and second full waste receptacles includes rollers attached thereto for supporting a rolling movement of the first and second full waste receptacles, and wherein the rollers contact a ground surface when the first and second full waste receptacles are coupled to the vehicle, and wherein transporting the first and second full waste receptacles to a third location comprises rolling the first and second full waste receptacles on the ground surface behind the vehicle.

12. A system for collecting and disposing waste from disparate locations to a centralized location within a facility, the system comprising:
- a vehicle;
- a first and a second waste receptacle each of the waste receptacles including:
  - four walls and an open top;
  - an attachment device supported on at least one of the four walls;
  - a net coupled to the attachment device and extending over the open top, wherein the net includes open spaces to accommodate direct placement of waste therethrough and into the waste receptacle; and
  - a chassis supporting the waste receptacle, the chassis including casters to accommodate rolling movement of the waste receptacle;
- wherein the first waste receptacle is coupled to the vehicle and the second waste receptacle is coupled to the first waste receptacle, the casters of each of the first and second waste receptacles contacting a ground surface when coupled, the vehicle operable to transport the first and second waste receptacles from a first location to a second location, wherein the casters move along the ground surface to accommodate movement of the first and second waste receptacles.

13. The system of claim 12, wherein the casters comprise a set of swivel lockable casters.

14. The system of claim 12, wherein the four walls are formed from a plastic material as a single integral component.

15. The system of claim 12, wherein the first waste receptacle includes a coupling mechanism supported by the chassis, the coupling mechanism including a tongue extending from one of a front portion or a rear portion of the chassis and a receiving hitch extending from the other of the front portion or the rear portion of the chassis, wherein the first waste receptacle is coupled to the vehicle via one of the tongue or the receiving hitch and the second waste receptacle is coupled to the first waste receptacle via the other of the tongue or receiving hitch.

* * * * *